(12) United States Patent
Washiya

(10) Patent No.: US 7,763,109 B2
(45) Date of Patent: Jul. 27, 2010

(54) METHOD AND SYSTEM FOR PRODUCING CELLULOSE ACYLATE FILM

(75) Inventor: Kimito Washiya, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 349 days.

(21) Appl. No.: 11/839,854

(22) Filed: Aug. 16, 2007

(65) Prior Publication Data

US 2008/0054215 A1   Mar. 6, 2008

(30) Foreign Application Priority Data

Sep. 6, 2006   (JP) .............................. 2006-241362

(51) Int. Cl.
  *C09D 101/08*   (2006.01)
(52) U.S. Cl. .............................. 106/204.01; 106/170.58
(58) Field of Classification Search ............ 106/170.58, 106/204.01
See application file for complete search history.

(56) References Cited

U.S. PATENT DOCUMENTS 4,499,043 A   2/1985   Yabe et al.

2003/0164115 A1 *  9/2003  Mukunoki et al. ..... 106/170.47
2004/0023051 A1    2/2004  Nishimura et al.

FOREIGN PATENT DOCUMENTS

| JP | 57-182737 A | 11/1982 |
|---|---|---|
| JP | 2003-001654 A | 1/2003 |
| JP | 2004-107629 A | 4/2004 |

\* cited by examiner

*Primary Examiner*—David M Brunsman
(74) *Attorney, Agent, or Firm*—Sughrue Mion, PLLC

(57) ABSTRACT

A cellulose acylate film producing method of producing cellulose acylate film by casting dope containing cellulose acylate and solvent is provided. The cellulose acylate film producing method includes adding a magnesium salt to the dope to satisfy a condition of a value of M2/M1 being equal to or more than $1\times10^{-6}$ and equal to or less than $1\times10^{-3}$, where M1 is a weight of the cellulose acylate, and M2 is a weight of magnesium in the magnesium salt. If the dope contains a calcium ion, the magnesium salt suppresses creation of insoluble precipitate of a calcium salt of a fatty acid from a fatty acid ion in the dope. Preferably, the magnesium salt is magnesium sulfate. A value of M3/M2 is equal to or more than $1\times10^{-3}$ and equal to or less than 10, where M3 is a weight of calcium contained in the dope.

5 Claims, 4 Drawing Sheets

METHOD AND SYSTEM FOR PRODUCING CELLULOSE ACYLATE FILM

BACKGROUND OF THE INVENTION

1. Field of the Invention

The present invention relates to a method and system for producing cellulose acylate film. More particularly, the present invention relates to a method and system for producing cellulose acylate film in which unwanted precipitate as fine dust can be prevented and also productivity of solution casting can be kept high.

2. Description Related to the Prior Art

Polymer compounds are used to produce polymer film as optical film owing to advantageous characteristics. The polymer film is attached on a surface of a polarizing element as a constituent of a liquid crystal display panel (LCD). Examples of the optical films are a protection film of a polarizing element, and an optical compensation film (view angle enlarging film or the like), and anti-reflection film. Among various examples, cellulose acylate film as polymer film produced from cellulose acylate is advantageous for high optical property and easy handling in the production.

A solution casting process is a typical method of producing cellulose acylate film. In the solution casting, dope is cast on a casting support which is moving, the dope containing cellulose acylate, solvent and additives. Then a cast film of the dope is stripped from the support, to obtain polymer film by drying. According to this method, the cellulose acylate can be free from thermal damage. Polymer film with high transparency can be produced with advantage in the solution casting over another method of melt forming known in the field of polymer film.

However, fine dust occurs on a surface of a casting support such as a drum or a belt of metal with time after continuous use in the solution casting. This phenomenon is called plating out. In FIG. 4, dope 2 with various components is illustrated. Fatty acid ion $(R-COO)^-$ of a fatty acid $R-COOH$, and calcium ion $Ca^{2+}$ of calcium Ca are initially contained in the cellulose acylate, and bind with one another to create insoluble precipitate of calcium salt $(R-COO)_2Ca$ of fatty acid. The fine dust is a result of presence of the insoluble precipitate on the surface. This is unfavorable in that the flatness of the cast film or cellulose acylate film will be lowered.

JP-A 2003-001654 discloses a method in which the film forming is stopped upon occurrence of plating out, and fine dust on the support is wiped by use of fabric with solvent. U.S.P. 2004/023051 (corresponding to JP-A 2004-107629) discloses a method in which stable fine particles as aid of filtration are disposed in the dope, the dope is passed through a filter sheet to form a porous layer on the filter sheet, so as to trap the insoluble precipitate. Occurrence of plating out is suppressed by casting dope after reduction of the insoluble precipitate.

However, JP-A 2003-001654 only discloses the method for use after occurrence of the plating out on the support. There is no prevention of the plating out. Also, the productivity may be low because the operation of film forming must be stopped. U.S.P. 2004/023051 (corresponding to JP-A 2004-107629) discloses the filter sheet having a small pore diameter for trapping fine particles of insoluble precipitate. Efficiency of filtration may be low because of the rise of the filtration pressure and filtration time.

SUMMARY OF THE INVENTION

In view of the foregoing problems, an object of the present invention is to provide a method and system for producing cellulose acylate film in which unwanted precipitate as fine dust can be prevented and also productivity of solution casting can be kept high.

In order to achieve the above and other objects and advantages of this invention, a cellulose acylate film producing method of producing cellulose acylate film by casting dope containing cellulose acylate and solvent is provided. The cellulose acylate film producing method includes using the dope containing a magnesium salt to satisfy a condition of a value of M2/M1 being equal to or more than $1\times10^{-6}$ and equal to or less than $1\times10^{-3}$, where M1 is a weight of the cellulose acylate, and M2 is a weight of magnesium in the magnesium salt.

If the dope contains a calcium ion, the magnesium salt suppresses creation of insoluble precipitate of a calcium salt of a fatty acid from a fatty acid ion in the dope.

The magnesium salt is selected from magnesium sulfate, magnesium chloride, magnesium bromide, magnesium iodide, magnesium nitrate, and magnesium phosphate.

In a preferred embodiment, the magnesium salt is magnesium sulfate.

Furthermore, there is a step of filtrating the dope with a filtration device after addition of the magnesium salt, to trap insoluble precipitate containing calcium sulfate created by binding of a sulfate ion derived from the magnesium sulfate and the calcium ion.

A value of M3/M2 is equal to or more than $1\times10^{-3}$ and equal to or less than 10, where M3 is a weight of calcium contained in the dope.

In one aspect of the invention, a cellulose acylate film producing system for producing cellulose acylate film by casting dope containing cellulose acylate and solvent is provided. A storage reservoir stores the dope. A reservoir stores a magnesium salt. A mixer adds the magnesium salt to the dope to satisfy a condition of a value of M2/M1 being equal to or more than $1\times10^{-6}$ and equal to or less than $1\times10^{-3}$, where M1 is a weight of the cellulose acylate, and M2 is a weight of magnesium in the magnesium salt.

In another aspect of the invention, a polymer solution composition is provided, and includes a cellulose acylate, a solvent, and a magnesium salt which satisfies a condition of a value of M2/M1 being equal to or more than $1\times10^{-6}$ and equal to or less than $1\times10^{-3}$, where M1 is a weight of the cellulose acylate, and M2 is a weight of magnesium in the magnesium salt.

Accordingly, unwanted precipitate as fine dust can be prevented and also productivity of solution casting can be kept high, because the magnesium salt prevent precipitation of a calcium salt of a fatty acid.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
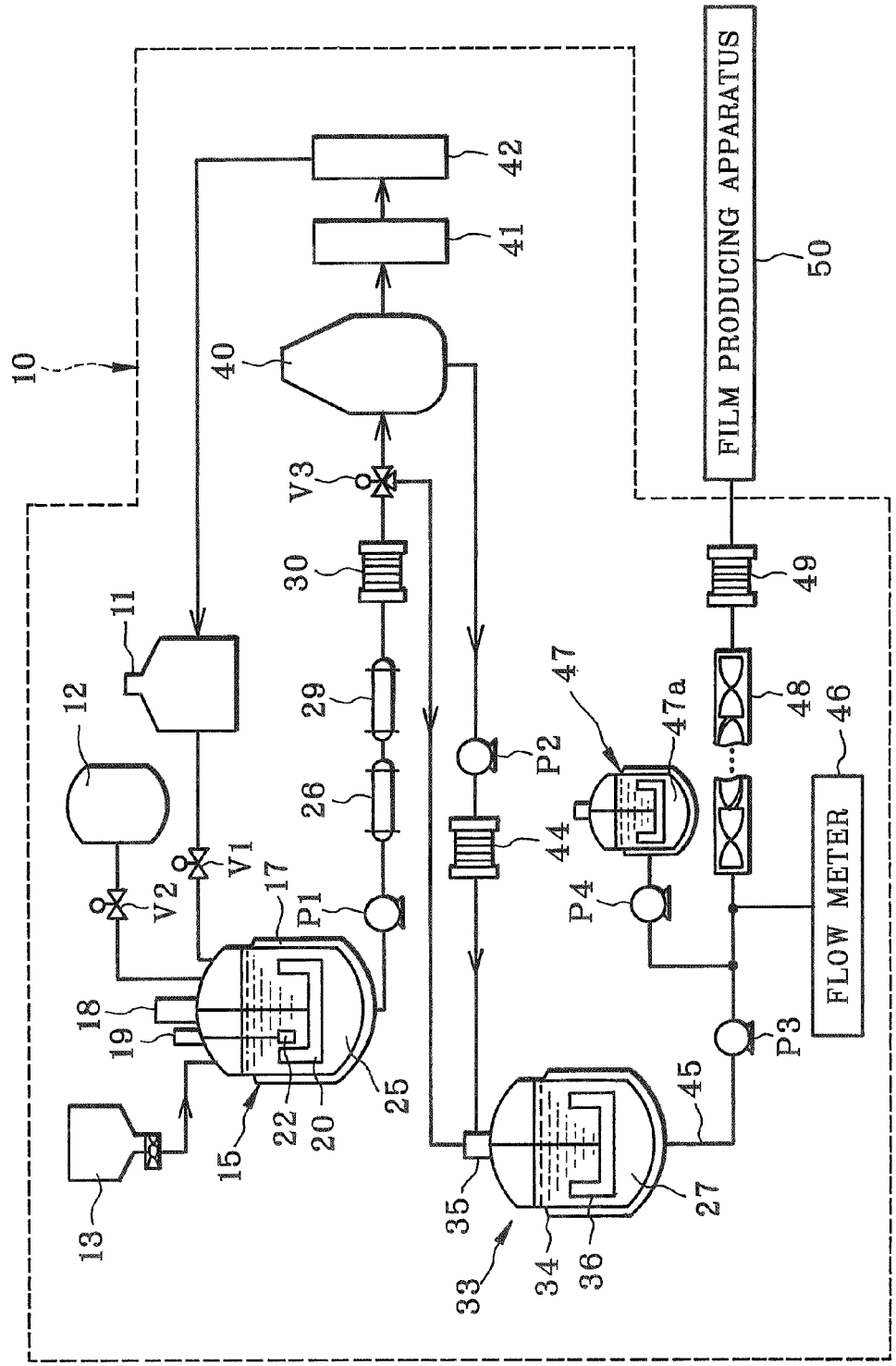
FIG. 1 is an explanatory view in elevation, illustrating a dope producing apparatus in a cellulose acylate film producing system.

In FIG. 1, a dope producing apparatus 10 in a polymer film producing system is illustrated, which is for use in the polymer film production of the invention.

A solvent reservoir 11 or tank stores solvent as raw material of dope. An additive reservoir 12 or tank stores additive solution obtained by mixing an additive with a solvent. A hopper 13 stores cellulose acylate. A mixing tank 15 is connected with any of those reservoirs. Various materials for the dope are sent to the mixing tank 15 at suitable amounts. To start and stop delivery of materials from the solvent reservoir 11 and the additive reservoir 12, valves V1 and V2 are opened and closed for adjustment.

A sequence and form of sending materials for the dope to the mixing tank 15 are not limited particularly. For example, plural materials can be sent simultaneously. Also, additives may be mixed with a mixture containing a solvent and polymer. Note that it is possible to deliver an additive to the mixing tank 15 in a normally liquid phase at a room temperature, unlike the solution of the initially solid additive in a solvent. Furthermore, if an additive is solid at a room temperature, the additive can be delivered to the mixing tank 15 by use of a hopper for the solid additive.

A jacket 17 is disposed on an outside of the mixing tank 15 of a stainless steel. Heat exchange medium of a conditioned temperature is caused to flow in the jacket 17, to condition its inner temperature at a constant level in a range from −10 to 55 deg. C. A first stirrer or anchor stirrer 20 is contained in the mixing tank 15. A motor 18 drives the anchor stirrer 20. A second stirrer or dissolver stirrer 22 is contained in the mixing tank 15. A motor 19 drives the dissolver stirrer 22. A mixed solution 25 is prepared by stirring and mixing various materials for dope with the anchor stirrer 20 and the dissolver stirrer 22 rotated continuously. In the embodiment, the anchor stirrer 20 is a stirrer with an anchor blade. The dissolver stirrer 22 is an eccentric type. The combined use of such plural types of stirrers is effective in mixing materials in the mixing tank 15 with high efficiency.

A heater 26 is supplied with the mixed solution 25 by the pump P1 from the mixing tank 15. The heater 26 includes a conduit and a jacket. The conduit causes the mixed solution 25 to flow. The jacket is disposed about the conduit, and controls an inner temperature of the conduit. A pressurizing mechanism is associated with the conduit for applying pressure to the inner region of the conduit. The mixed solution 25 is heated by the heater 26 and conditioned at a constant temperature in a range of 0-97 deg. C., to raise solubility of the solid content in the solvent. The pressurizing mechanism can operate to apply pressure to the mixed solution 25 further to raise the solubility. Note that the term of heating by the heater 26 is used for the rise of the temperature of the mixed solution 25. It is unnecessary to heat the mixed solution 25 up to a level higher than the room temperature. For example, it is possible for the heater 26 to raise the temperature of the mixed solution 25 from −7 deg. C. to 0 deg. C.

In the embodiment, thermal dissolution is used for promoting dissolving of the mixed solution 25. Also, a process of cooling dissolution instead of the thermal dissolution can be used, in which the mixed solution 25 is cooled at a temperature between −10 and −100 deg. C. The cellulose acylate can be dissolved in the solvent sufficiently by suitable selection of the thermal dissolution and cooling dissolution. Only one or both two of the thermal dissolution and cooling dissolution can be used. Note that a term of dissolving amount in relation to solution is used to mean an amount of the solid content of cellulose acylate or the like in a solvent.

A temperature adjuster 29 is supplied with the mixed solution 25 of a high dissolving amount. Dope 27 is obtained by conditioning the mixed solution 25 at the room temperature. In the embodiment, the term of dope is used to mean the mixed solution 25 with a high dissolving amount. The solution flowing downstream from the temperature adjuster 29 is the dope 27. In addition, the solution directly flowing from the heater 26 but having a high dissolving amount can be the dope 27. It is unnecessary in the dope 27 to dissolve all of the solid content in a solvent. The dope 27 may be fluid in which the solid content is dispersed in liquid.

A first filtration device 30 includes filter paper or filter sheet of a porous form having an average pore diameter equal to or less than 100 microns. When the dope 27 flows into the first filtration device 30, the filter paper traps insoluble precipitate in the dope 27. The pore diameter and material of the filter sheet are not limited. The filter sheet may be a metal filter of stainless steel, an organic filter of cellulose material, or the like. The insoluble precipitate of a fine size can be trapped according to the smallness of the average pore diameter of the filter paper or filter sheet. However, efficiency of filtration lowers according to considerably long time of filtration. If the average pore diameter is too great, the insoluble precipitate of a fine size in the dope 27 is difficult to trap. Accordingly, the pore diameter of the filter paper is suitably determined by considering time and efficiency of filtration.

A storage reservoir or stock tank 33 is supplied with the dope 27 which is conditioned at an intended density after the filtration. The storage reservoir 33 stores the dope 27. A jacket 34 is disposed on an outer surface of the storage reservoir 33. A stirrer 36 is contained in the storage reservoir 33. A motor 35 rotates the stirrer 36, to stir the dope 27 in the storage reservoir 33 conditioned at a predetermined temperature. The dope 27 is kept uniform by suppressing agglomeration of the solid content and creation of foreign material before use in the casting.

There is a problem in the preparing method of the dope 27 of a target density by use of the mixed solution 25. This is because the time for preparation is long according to the highness of the target density of the dope 27, to increase the time and cost of the production. Therefore, a method is used in which the dope 27 is initially prepared at a lower density than the target density, and then the dope 27 is condensed to increase the density. This is effective in obtaining the dope 27 of a high density in a short time. Details of this will be described next.

At first, dope of a low density is preferably prepared in comparison with the target density. Any of the various methods for preparation of the dope 27 can be used. A flash evaporator or flash device 40 is supplied by a valve V3 with the dope filtrated by the first filtration device 30. Part of the solvent in the dope 27 is evaporated in the flash device 40 for condensation. The dope 27 at a high density can be obtained shortly. The solvent in the gas phase is liquefied by a condenser (not shown). A solvent recovery device 41 collects the gaseous solvent. A refiner 42 is supplied with the collected solvent, and refines a solvent ready for use in preparing the dope by removing water and impurities. The use of the refiner 42 is effective in the reuse of the dope 27 to reduce the manufacturing cost.

After the condensation of the dope 27, a second filtration device 44 is supplied with the dope 27 from the flash evaporator or flash device 40 by the pump P2. The second filtration device 44 includes filter paper or filter sheet of a porous form. The filter paper is not limited, and can be the same as that in the first filtration device 30. The dope 27 can be preferably conditioned at a temperature of 0-200 deg. C. A preferable flow rate at the second filtration device 44 in the filtration is 50 liters per hour or more. It is possible to reduce possibility to apply excessive load to the filtration devices. It is also preferable that the first filtration device 30 satisfies the same condition as the second filtration device 44. The dope 27 of which the insoluble precipitate is trapped by the second filtration device 44 is sent to the storage reservoir or stock tank 33, and stored readily for casting.

It is likely that considerable bubbles are contained in the dope 27 after being condensed by the flash evaporator or flash device 40. Holes or gaps are formed in bead of cast film if the dope 27 is cast with bubbles, to cause defects on the film surface. It is preferable to defoam the dope 27 from the flash device 40 to eliminate bubbles. Any known defoaming methods can be used for removing bubbles. In the embodiment, ultrasonic defoaming is used to apply ultrasonic waves to the dope 27 immediately obtained from the flash device 40.

A conduit 45 extends from the storage reservoir or stock tank 33. The dope 27 contained in the storage reservoir 33 is sent by the pump P3 to the conduit 45 while adjusted for its amount of addition. A precipitation inhibitor reservoir or scavenger reservoir 47 or tank is connected to the conduit 45 via the pump P4. A precipitation inhibitor or scavenger 47a is contained in the precipitation inhibitor reservoir 47 and sent by the pump P4 to the conduit 45 while adjusted for its amount of addition. The precipitation inhibitor 47a is a composition or solution containing a magnesium salt and a solvent which is also one of components contained in the dope. A static mixer 48 sufficiently stirs and mixes the dope 27 with the precipitation inhibitor 47a being added. The precipitation inhibitor 47a is added at such an adjusted amount that a ratio M2/M1 is equal to or more than $1\times10^{-6}$ and equal to or less than $1\times10^{-3}$, where M1 (grams) is a weight of the cellulose acylate contained in the dope 27, and M2 (grams) is a weight of the magnesium in the precipitation inhibitor 47a. Preferably, the ratio M2/M1 is equal to or more than $3\times10^{-6}$ and equal to or less than $10^{-4}$. Preferable examples of magnesium salts are magnesium sulfate, magnesium chloride, magnesium bromide, magnesium iodide, magnesium nitrate, magnesium phosphate and the like. A flow meter 46 measures a flow rate of the solution at an upstream end of the static mixer 48.

Figure 4:
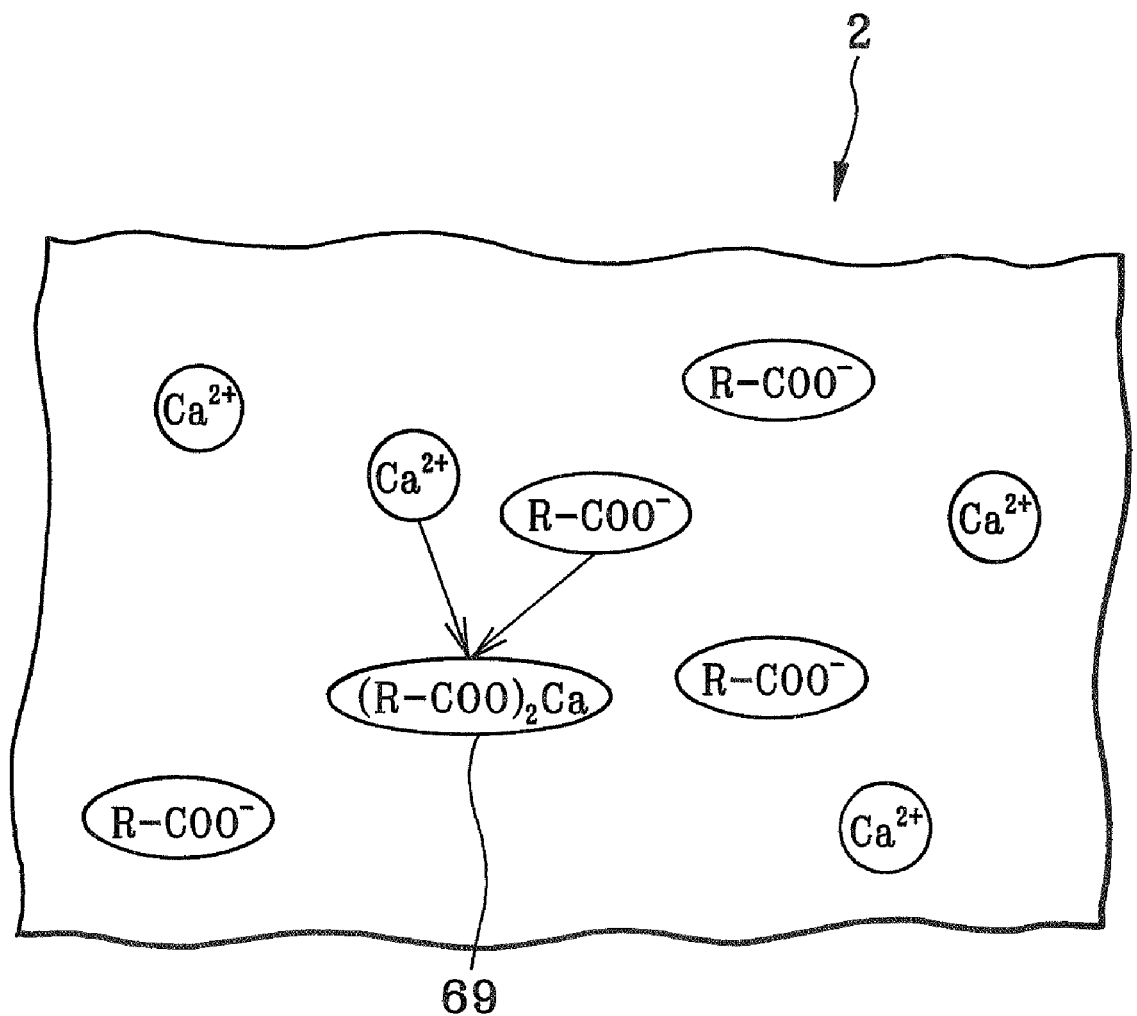
FIG. 4 is a schematic view illustrating conventionally used dope containing various components.

A filtration device 49 is disposed downstream from the static mixer 48. The dope 27 containing the magnesium salt is sent to the filtration device 49. In the dope 27 of FIG. 2, calcium sulfate 68 and a magnesium salt of fatty acid 67 are trapped. A calcium salt of fatty acid 69 of FIG. 4, if created, can be trapped. The dope 27 having little insoluble precipitate can be obtained with high purity.

The amount of addition of the precipitation inhibitor 47a is determined according to the amount of the cellulose acylate used for each of manufacturing lots of preparation of the dope. The flow rate of the precipitation inhibitor 47a according to the pump P4 and the flow rate of the dope 27 flowing into the conduit 45 are adjusted to regulate a ratio of addition of the precipitation inhibitor 47a relative to a constant amount in the dope 27 flowing in the conduit 45. Initially to prepare the dope, an amount of casting is estimated by calculation according to the flow rate at the pump P3 for the entire amount of the dope 27 to be prepared. Then all of the dope is cast, before the amount of addition and the flow rate of the precipitation inhibitor 47a are determined again.

Figure 2:
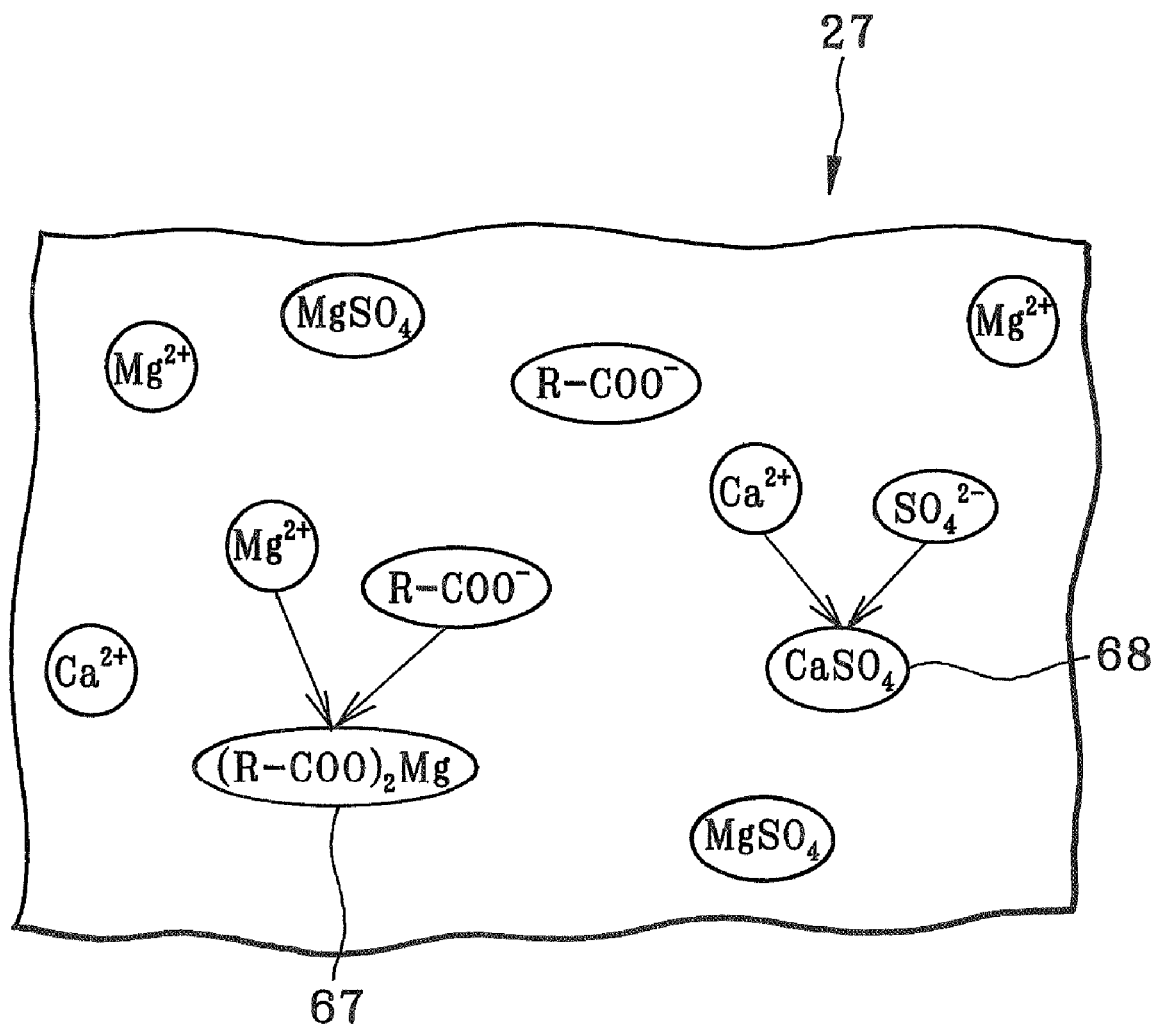
FIG. 2 is a schematic view illustrating dope containing various components.

In FIG. 2, components in the dope 27 are schematically illustrated, including $MgSO_4$ or magnesium sulfate as a magnesium salt. Although numerous ions and the like are present in the dope 27, those are depicted with sufficient spaces for simplicity.

The dope 27 contains ions of numerous examples, such as fatty acid ion $(R-COO)^-$, calcium ion $Ca^{2+}$ and the like ionized from fatty acid $R-COOH$ and calcium Ca contained in the cellulose acylate composition. The magnesium sulfate $MgSO_4$ is now added to the dope 27 for presence of the magnesium ion $Mg^{2+}$ and sulfate ion $SO_4^{2-}$. Binding of the fatty acid ion $(R-COO)^-$ with the calcium ion $Ca^{2+}$ is inhibited by the presence of the magnesium ion $Mg^{2+}$, which results in creating the magnesium salt $(R-COO)_2Mg$ of a fatty acid. Thus, the calcium ion $Ca^{2+}$ binds with the sulfate ion $SO_4^{2-}$ to create calcium sulfate $CaSO_4$. The precipitation inhibitor 47a is added at such an adjusted amount that a ratio M3/M2 is equal to or more than $1\times10^{-3}$ and equal to or less than 10, where M2 (grams) is a weight of the magnesium in the precipitation inhibitor 47a, and M3 (grams) is a weight of the calcium contained in the dope 27. Preferably, the ratio M3/M2 is equal to or more than $5\times10^{-3}$ and equal to or less than 1. Note that the calcium content and magnesium content can be detected in the dope 27 by measuring the atomic absorption of the dope 27. The magnesium salt $(R-COO)_2Mg$ of a fatty acid has sufficient solubility owing to a smaller crystalline property than the calcium salt $(R-COO)_2Ca$ of a fatty acid, and thus does not cause plating out.

The use of the magnesium sulfate as magnesium salt in the embodiment is effective in suppressing creation of calcium salt of a fatty acid, because the sulfate ion from the magnesium sulfate binds with the calcium ion to create the calcium sulfate. Note that, in addition to the sulfate ion, salts containing carbonate ion, polymeric carboxylic acid and the like can be used for binding with the calcium ion. However, the magnesium sulfate is the most suitable in consideration of creation of a magnesium salt of a fatty acid having high solubility.

Elements, components and the like as constituents of the dope producing apparatus 10 are interconnected with conduits produced from stainless steel for high resistance to corrosion, resistance to heat, and the like. The number, position and the like of the pumps, valves and others are not limited in the dope producing apparatus 10, and can be modified if required.

Various substances for dopes are specifically described next.

For polymer of the dope, cellulose ester can be preferably used. Examples of cellulose esters are cellulose triacetate, cellulose acetate propionate, cellulose acylate butylate and other cellulose esters of lower fatty acids. In particular, cellulose acylate is preferable for obtaining high transparency. Specifically, triacetyl cellulose (TAC) is desirable. Note that the dope in the present embodiment contains triacetyl cellulose (TAC) as polymer. Preferably, 90 wt. % or more of the entirety of TAC should be particles of 0.1-4 mm.

Preferable examples of cellulose acylates satisfy all of the conditions I-III as follows for the purpose of high transparency:

$$2.5 \leq A+B \leq 3.0 \qquad \text{I}$$

$$0 \leq A \leq 3.0 \qquad \text{II}$$

$$0 \leq B \leq 2.9 \qquad \text{III}$$

where A and B represent a degree of substitution of an acyl group (—CO—R) formed by substituting hydroxy groups in cellulose. A represents a degree of substitution of an acetyl group (—CO—CH$_3$) formed by substituting hydroxy groups in cellulose. B represents a total degree of substitution of acyl groups having 3-22 carbon atoms.

The cellulose is constructed by glucose units making a beta-1,4 bond, and each glucose unit has a liberated hydroxy group at second, third and sixth positions. Cellulose acylate is a polymer in which part or whole of the hydroxy groups are esterified so that the hydrogen is substituted by acyl groups having two or more carbon atoms. The degree of substitution for the acyl groups in cellulose acylate is a degree of esterification at second, third or sixth position in cellulose. Accordingly, when 100% of the hydroxy group at the same position is substituted, the degree of substitution at this position is 1.

The total degree of substitution DS2+DS3+DS6 for the acyl groups at the second, third or sixth positions is in the range of 2.00-3.00, preferably 2.22-2.90, and in particular preferably 2.40-2.88. The sign DS2 is a degree of substitution for the acyl groups at the second position in hydroxy groups in the glucose unit. The signs DS3 and DS6 are degrees of substitution for the acyl groups at respectively the third and sixth positions in hydroxy groups in the glucose unit. Further, a ratio DS6/(DS2+DS3+DS6) is preferably 0.28 or more, and particularly 0.30 or more, and especially in the range of 0.31-0.34.

An acyl group of only one example may be contained in the cellulose acylate of the invention. However, cellulose acylate may contain acyl groups of two or more examples. If two or more acyl groups are contained, one of the plural acyl groups should be preferably an acetyl group. Let DSA be a total degree of substitution for the acetyl groups. Let DSB be a total degree of substitution for other acyl groups at the second, third or sixth positions than the acetyl groups. The value DSA+DSB is preferably in the range of 2.22-2.90, and particularly in the range of 2.40-2.88.

Further, the DSB is preferably at least 0.30, and especially at least 0.70. Furthermore, in the DSB, the percentage of a substituent at the sixth position is preferably at least 20%, preferably at least 25%, especially at least 30% and most especially at least 33%. Further, the value DSA+DSB at the sixth position is at least 0.75, preferably at least 0.80, and especially at least 0.85. Cellulose acylate satisfying the above conditions can be used to prepare a solution or dope having a preferably high solubility. Especially, when chlorine-free type organic solvent is used, the adequate dope can be prepared. Also, the dope can be prepared to have a low viscosity, and high solubility, and the suitability for filtration becomes higher.

Cellulose to produce cellulose acylates can be obtained from any one of linter cotton and pulp cotton.

Examples of acyl groups in cellulose acylates having two or more carbon atoms can be aliphatic groups, aryl groups, and the like. For example, cellulose acylates may be alkyl carbonyl esters, alkenyl carbonyl esters, aromatic carbonyl esters, aromatic alkyl carbonyl esters, and the like of cellulose, and can further contain a substitution group. Preferable examples of groups include: propionyl, butanoyl, pentanoyl, hexanoyl, octanoyl, decanoyl, dodecanoyl, tridecanoyl, tetradecanoyl, hexadecanoyl, octadecanoyl, iso-butanoyl, tert-butanoyl, cyclohexane carbonyl, oleoyl, benzoyl, naphthyl carbonyl, and cinnamoyl. Among those, particularly preferable groups are propionyl, butanoyl, dodecanoyl, octadecanoyl, tert-butanoyl, oleoyl, benzoyl, naphthyl carbonyl, and cinnamoyl. Further, specifically preferable groups are propionyl and butanoyl.

Details of cellulose acylates are according to various relevant techniques suggested in JP-A 2005-104148. Those examples and their various features can be used in the present invention.

I. Specific Examples of Cellulose Acylates

Suggested in JP A 57-182737 (corresponding to U.S. Pat. No. 4,499,043), JP A 10-45803 (corresponding to U.S. Pat. No. 5,856,468), JP A 11-269304 (corresponding to U.S. Pat. No. 6,139,785), JP A 8-231761, JP A 10-60170, JP A 9-40792, JP A 11-5851, JP A 9-90101, JP A 4-277530, JP A 11-292989, JP A 2000-131524, and JP A 2000-137115.

II. Specific Examples of Solvents for Esters and Their Dissolution

Suggested in JP A 10-324774, JP A 8-152514, JP A 10-330538, JP A 9-95538 (corresponding to U.S. Pat. No. 5,663,310), JP A 9-95557 (corresponding to U.S. Pat. No. 5,705,632), JP A 10-235664 (corresponding to U.S. Pat. No. 6,036,913), JP A 2000-63534, JP A 11-21379, JP A 10-182853, JP A 10-278056, JP A 10-279702, JP A 10-323853 (corresponding to U.S. Pat. No. 6,036,913), JP A 10-237186, JP A 11-60807, JP A 11-152342, JP A 11-292988, J PA 11-60752, JP A 2000-95876, and JP A 2000-95877.

Solvent as raw material of dope is preferably an organic compound in which polymer is soluble. The term of dope in the invention is used as mixture obtained by dissolution or dispersion of polymer in a solvent. It is possible to use a solvent with low solubility for polymer. Examples of solvents for preparing the dope include:

aromatic hydrocarbons, such as benzene and toluene;

halogenated hydrocarbons, such as dichloromethane, chloroform and chlorobenzene;

alcohols, such as methanol, ethanol, n-propanol, n-butanol, and diethylene glycol;

ketones, such as acetone and methyl ethyl ketone;

esters, such as methyl acetate, ethyl acetate, and propyl acetate;

ethers, such as tetrahydrofuran and methyl cellosolve.

It is possible selectively to use two or more of those by mixture. In particular, dichloromethane can be used to obtain dope with high solubility. The solvent in the cast film can be evaporated to form the polymer film.

Preferable halogenated hydrocarbons for use contain 1-7 carbon atoms. Specifically, it is preferable in a mixed solvent to mix one or more alcohols containing 1-5 carbon atoms with the dichloromethane, for the purpose of high solubility, easy separability from a support for casting, mechanical strength of film material, and various optical characteristics of a cellulose ester. Such alcohols are contained in the mixed solvent preferably in a range of 2-25 wt. %, and desirably in a range of 5-20 wt. %. Preferable examples of alcohols are methanol, ethanol, n-propanol, isopropanol, n-butanol and the like. Among those, specifically preferable alcohols are methanol, ethanol, n-butanol, and mixture of two or more of them.

Solvents not containing dichloromethane are effectively used in the publicly suggested requirement, for the purpose of minimizing influence to environment. Examples of compounds useful to this end are ethers having 4-12 carbon atoms, ketones having 3-12 carbon atoms, and esters having 3-12 carbon atoms. Those can be mixed for use. Ethers, ketones, esters and alcohols of the examples may have a cyclic structure. Compounds having two or more functional groups of —O—, —CO— and —COO—, namely groups of ethers, ketones and esters can be used as a solvent. A compound as solvent may have other functional groups, such as alcoholic hydroxy group. If two or more functional groups are included, the number of carbon atoms can satisfy a range condition of a compound having any one of the two functional groups. The number of carbon atoms is not limited.

Various additives may be mixed in the dope for purposes, such as plasticizers, ultraviolet (UV) absorbers, deterioration inhibitors, lubricants, stripping accelerators, and other additives. Preferable examples of plasticizers are triphenyl phosphate, biphenyl diphenyl phosphate, and other phosphate esters, and diethyl phthalate and other phthalate esters, and polyester polyurethane elastomer.

Fine particles can be preferably added to dope for the purpose of preventing adhesion between polymer films, and adjusting a refractive index. Examples of materials of the fine particles are silicon dioxide derivatives. Examples of silicon dioxide derivatives include silicon dioxide, silicone resin in a honeycomb structure of three dimensions, and the like. Preferably, the surface of the silicon dioxide derivative is an alkylated surface. Fine particles processed by alkylation or hydrophobic modification have high dispersibility in solvent. Dope can be prepared without agglomeration of fine particles, to produce polymer film reliably. The polymer film can have high transparency with a reduced amount of surface defects.

An example of fine particles with an alkylated surface is Aerosil R805 (trade name) manufactured by Nippon Aerosil Co., Ltd., as a derivative of silicon dioxide with an octyl group on the surface. The ratio of the content of the fine particles relative to the solid content of the dope is preferably 0.2% or less for the purpose of obtaining polymer film with high transparency and with effects of adding the fine particles. An average particle diameter of the fine particles, in view of allowing passage of light without blocking, is equal to or less than 1.0 micron, preferably 0.3-1.0 micron, and desirably 0.4-0.8 micron.

For a raw material of the dope, triacetyl cellulose (TAC) as polymer can be preferably used for obtaining high transparency of polymer film. According to the above embodiment, a dope containing TAC at a density of 5-40 wt. % is obtained. A density of the TAC in the dope is preferably equal to or more than 15 wt. % and equal to or less than 30 wt. %, and desirably equal to or more than 17 wt. % and equal to or less than 25 wt. %. A density of the additive, of which a main content is a plasticizer, in the dope is preferably equal to or more than 1 wt. % and equal to or less than 20 wt. % in 100 wt. % of the solid content in the dope.

Uses of various materials in relation to the polymer have been suggested in JP-A 2005-104148, including solvents, plasticizers, deterioration inhibitors, ultraviolet (UV) absorbers, lubricants, stripping accelerators, optical anisotropy control agents, retardation control agents, dyes, release agents, and other additives.

I. Plasticizers

Suggested in JP A 4-227941, JP A 5-194788, JP A 60-250053, JP A 6-16869, JP A 5-271471, JP A 7-286068, JP A 5-5047 (corresponding to U.S. Pat. No. 5,279,659), JP A 11-80381, JP A 7-20317, JP A 8-57879, JP A 10-152568, and JP A 10-120824.

II. Deterioration Inhibitors and UV Absorbers

Suggested in JP A 60-235852, JP A 3-199201, JP A 5-190707, JP A 5-194789, JP A 5-197073, JP A 5-271471, JP A 6-107854, JP A 6-118233, JP A 6-148430, JP A 7-11055, JP A 7-11056, JP A 8-29619, JP A 8-239509 (corresponding to U.S. Pat. No. 5,806,834), JP A 2000-204173, and JP A 2000-193821.

In the dope production from cellulose triacetate, various techniques suggested in JP-A 2005-104148 for dissolution of materials and additives, filtration, elimination of bubbles, mixing of additives can be used.

No. 1. Dissolution Related to Casting

Suggested in JP A 9-95544 (corresponding to U.S. Pat. No. 5,663,310), JP A 10-45950, JP A 10-95854 (corresponding to U.S. Pat. No. 5,783,121), and JP A 2000-53784.

No. 2. Specific Preparing Methods of Solutions

Suggested in JP A 11-310640 (corresponding to U.S. Pat. No. 6,211,358), JP A 11-323017, JP A 11-302388, and JP A 2000-273184.

No. 3. Condensation of Solutions

Suggested in JP A 4-259511; U.S. Pat. No. 2,541,012, U.S. Pat. No. 2,858,229, U.S. Pat. No. 4,414,341, and U.S. Pat. No. 4,504,355.

Figure 3:
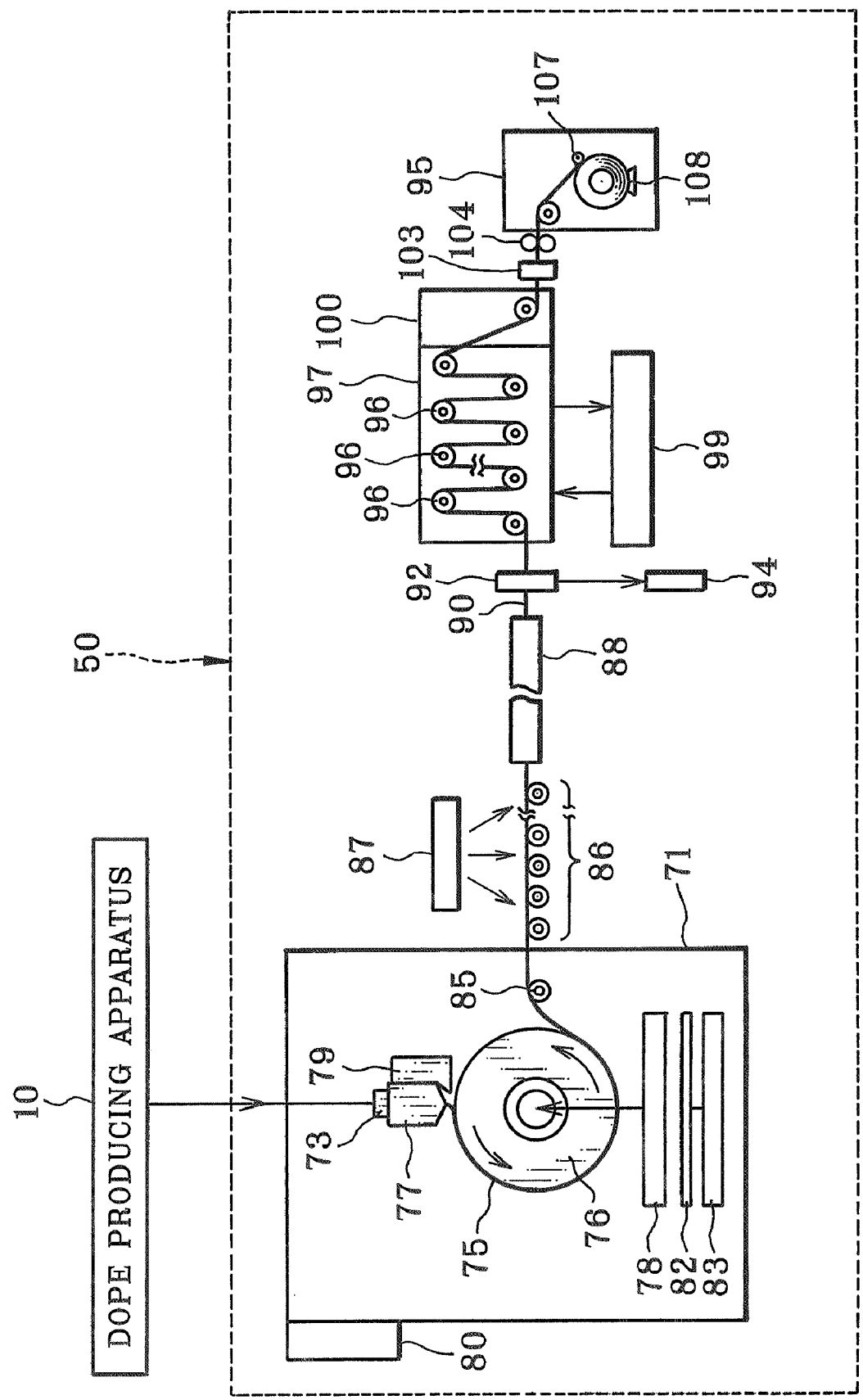
FIG. 3 is an explanatory view in elevation, illustrating a film producing apparatus.

Production of the cellulose acylate film of the invention is described now specifically. In FIG. 3, a cellulose acylate film producing apparatus 50 is illustrated schematically. Note that the invention is not limited to the embodiment.

There is a casting chamber 71 for casting of the dope 27. A feed block 73 in the casting chamber 71 is supplied with the dope 27 from the dope producing apparatus 10 by a conduit. In the feed block 73 are formed one or more flow channels, which are shaped according to a layer structure of cast film 75. Disposition of the dope 27 is determined by the flow channels.

A casting die 76 is supplied with the dope 27. A die slot is formed in the casting die 76 for ejection of the dope 27. A casting support drum 77 is so disposed that the die slot of the casting die 76 is positioned directly higher than the support drum 77. The shape, material, size and the like of the casting die 76 are not limited. A coat hanger type of die is preferable for the casting die 76 so a casting width of the dope can be kept regular. A preferable size of the slot is 1.1-2.0 times as long as the casting width of the dope. A preferable material of the casting die 76 can be stainless steel of a type of precipitation hardening owing to the durability, heat resistance and the like. Also, the material of the casting die 76 has the corrosion resistance sufficient for prevention of pitting on the gas-liquid interface even after dipping in a liquid mixture of dichloromethane, methanol and water for three (3) months. Desirably, a corrosion resistance of the material should be equal to that of SUS 316 steel according to forced corrosion test in electrolytic aqueous solution. In view of heat resistance, the material can have a coefficient of thermal expansion of $2 \times 10^{-5}$ (/deg. C.) or less.

A hardened layer or case can be preferably formed on the end of the slot lip of the casting die 76. Various methods for forming the hardened layer or case can be used, including application of a ceramic coating, a hard chromium plating, and processing of nitriding. In case of using the ceramic coating, the material of the ceramic coating should have suitability for grinding, low porosity, low fragility, high resistance to corrosion, suitability for adhesion to the casting die 76, and property of small adhesion to the dope 27. Specifically, WC (tungsten carbide), $Al_2O_3$, TiN, $Cr_2O_3$ and the like can be used, among which WC is particularly preferable. A thermal spray process can be used for applying a WC coating.

A contact surface of the casting die 76 for the dope 27 is preferably a polished or abraded surface for high smoothness to form the cast film 75 with high flatness. An aspiration device (not shown) is preferably connected to a slot edge portion of the casting die 76, and aspirates air at an edge flow rate of 1-100 liters per minute. Thus, it is possible to reduce an air flow which might cause unevenness on surfaces of the bead of the dope 27.

The support drum 77 operates continuously for moving rotationally as a casting support. A coolant circulator 78 or heat exchange medium circulator supplies a flow path in the support drum 77 with coolant. This maintains a surface temperature of the support drum 77 constantly in a range of −40 to 30 deg. C. The dope 27 at a conditioned temperature is ejected by the slot of the casting die 76 and cast on to the support drum 77. In the casting, temperature of the dope is constant in a range of −10 to 55 deg. C. which can be set easily by adjusting the inner temperature of the feed block 73 and the casting die 76. In the embodiment, temperature of the dope 27 is maintained at −5 deg. C. Therefore, the dope 27 is cooled on the support drum 77 efficiently and effectively. The cast film 75 of a gel form can be obtained only in a short time.

The support drum 77 is a support for casting. However, a support for casting may not be the support drum 77. For example, a casting support belt may be used, which is supported on a pair of rollers for turning about in an endless manner. A width of the support drum 77 may not be limited to a certain size. A preferable width of the support drum 77 can be 1.1-2.0 times as much as a casting width of the dope 27. The material of the support drum 77 is preferably stainless steel, and has sufficient strength and resistance to corrosion. The surface of the support drum 77 should be preferably polished for the purpose of forming a cast film with high flatness.

Specifically, a solvent delivery device (not shown) can be connected to an end of the die slot of the casting die 76. A solvent for imparting solubility to the dope 27 can be supplied to a gas-liquid-solid interface between an end of the casting bead, the die slot, and ambient gas. An example of the solvent can be a mixed solvent containing 86.5 parts by weight of dichloromethane, 13 parts by weight of acetone, and 0.5 part by weight of n-butanol. It is possible to prevent drying and local solidification of the dope 27 at the end of the die slot to stabilize the bead. A cellulose acylate film with high transparency without defects can be obtained because of reduction of unwanted mixture of solidified dope in the bead or the cast film 75 as foreign material. A pump for delivering the mixed solvent should have a fluctuation ratio of 5% or lower. The mixed solvent should be delivered to each of two slot ends at a range of 0.1-1.0 ml/min.

In the course of casting, a decompression chamber 79 conditions the pressure in such a manner that the pressure on the rear side of the bead of the dope 27 or on the upstream side is lower than the atmospheric pressure. The pressure of the rear side of the bead is kept at a constant level which is equal to more than (AP−2,000 Pa) and equal to or less than (AP−10 Pa) where AP is the atmospheric pressure. The bead of the dope 27 is sucked in a direction toward the support drum 77. Entrainment of air on the bead is suppressed to form the cast film 75. A temperature adjuster 80 adjusts the inner temperature of the casting chamber 71 for conditioning at a constant level in a range of −10 to 57 deg. C. A condenser 82 is supplied with gaseous solvent derived by evaporation from the dope 27 or the cast film 75, and liquefies the solvent. Then a solvent recovery device 83 recovers the solvent. The recovered solvent is refined by a refiner (not shown) in connection with the solvent recovery device 83, and is reused as a dope preparing solvent. Therefore, the cost for the material can be reduced.

Gelling of the cast film 75 proceeds by cooling on the support drum 77 in lapse of time. When the cast film 75 comes to have a self-supporting property in the course of gelling, a stripping roller 85 strips the cast film 75 from the support drum 77 by supporting the cast film 75. The cast film 75 immediately after stripping can preferably have a residual solvent amount of the solvent in a range of 10-200 wt. %. Then a transition region 86 is supplied with the cast film 75 being transported, the transition region 86 having a plurality of pass rollers. In the transition region 86, a dryer 87 blows dry gas at an intended temperature, to quicken drying of the cast film 75 supported by the pass rollers. It is preferable that the temperature of the dry gas is equal to or higher than 20 deg. C. and equal to or lower than 250 deg. C., so the cast film 75 be dried efficiently without damage of heat.

A tentering machine 88 is supplied with the cast film 75 being transported. Plural pins near to the upstream end of the tentering machine 88 are pierced in web edges of the cast film 75 for fixation. A temperature adjuster (not shown) is associated with the tentering machine 88, and conditions the inner temperature of the tentering machine 88 at a constant level in a range equal to or higher than 120 deg. C. and equal to or lower than 180 deg. C. Drying of the cast film 75 is promoted by passage through the tentering machine 88. Rails are disposed to extend with their increasing interval in the downstream direction within the tentering machine 88. The cast film 75 becomes gradually stretched in the web width direction while transported. Molecular orientation of the cast film 75 is controlled in the web width direction. Cellulose acylate film or polymer film 90 with high retardation is obtained after promoting drying of the cast film 75. Note that a device for compression may be used for stretching the cast film 75 in the web width direction in place of the rails for stretching and orientation. In the downstream end of the tentering machine 88, the pins are released from the cellulose acylate film 90 which becomes free from the fixation. Note that the tenter pins are used in the tentering machine 88. However, the tentering machine 88 maybe a clip type in which tenter clips are used for holding the web edges of the cast film 75.

A web edge slitter 92 slits away the web edge portions of the cellulose acylate film 90 transported out of the tentering machine 88. Pierced regions in the web edge portions due to the tenter pins for the cellulose acylate film 90 are eliminated by cutting. A film crusher 94 is connected with the web edge slitter 92 for crushing cut portions of web edges of the cellulose acylate film 90 as chips. Note that no slitting of the cellulose acylate film 90 can be performed in the producing system. However, it is preferable to slit the cellulose acylate film 90 in any of plural regions to a winder 95 from the casting chamber 71, for the purpose of the cellulose acylate film 90 without much defects.

There is a drying chamber or dryer 97 in which a plurality of rollers 96 are arranged. The cellulose acylate film 90 is transported into the drying chamber 97 and supported and moved by the rollers 96. A temperature adjuster (not shown) is used to control the surface temperature of the cellulose acylate film 90 in a constant range of 60-145 deg. C. Thus, drying of the cellulose acylate film 90 can be promoted without thermal damage. A thermometer (not shown) is disposed on a transport path of the cellulose acylate film 90 and close to its surface, so the surface temperature of the cellulose acylate film 90 can be found easily. In the drying chamber 97, an adsorption solvent recovery device 99 recovers gaseous solvent evaporated from the cellulose acylate film 90. Then the solvent component is removed from air, which is caused to flow in the drying chamber 97 as dry air. Thus, no gaseous solvent comes to stick on the cellulose acylate film 90. A cost for energy can be reduced. It is preferable between the web edge slitter 92 and the drying chamber 97 to install a pre-drying chamber (not shown), which pre-dries the cellulose acylate film 90 in a preliminary manner before drying in the drying chamber 97. This is effective in suppressing abrupt rise of the surface temperature of the cellulose acylate film 90 in the drying chamber 97 and preventing serious deformation of the cellulose acylate film 90.

The dried state of the cast film 75 or the cellulose acylate film 90 is conceivable according to an amount of the residual solvent. The residual solvent amount is an amount expressed in the formula of $[(x-y/y] \cdot 100$ where x is a weight of the inspected sample according to the dry base, and y is a weight of the sample in the totally dried state. If solvent in the sample is a composition containing plural examples or compounds, the residual solvent amount is determined as a sum of residual amounts of the plural compounds as solvent.

A cooling chamber or cooler 100 is supplied with the cellulose acylate film 90, which is cooled down approximately to the room temperature. Any of various cooling methods can be used. For example, the cellulose acylate film 90 can be left to stand for natural cooling in the cooling chamber 100 set at the room temperature for heat dissipation. Also, a fan or blower can be installed in the cooling chamber 100 for blowing cold air to the cellulose acylate film 90 for cooling. Furthermore, a fluidity adjusting chamber (not shown) may be disposed between the drying chamber 97 and the cooling chamber 100. The cellulose acylate film 90 can be cooled after adjustment of fluidity of the cellulose acylate film 90 in the chamber. This is effective in flattening the cellulose acylate film 90 even if wrinkles have occurred on its surface.

Then a static eliminator 103 adjusts the voltage of the cellulose acylate film 90 in the electrification. A preferable range of the electrification of the cellulose acylate film 90 is not limited, but preferably can be constant in a range equal to or higher than −3 kV and equal to or lower than +3 kV. Furthermore, a knurling roller 104 is used to knurl web edge portions of the cellulose acylate film 90 by embossing. Finally, the cellulose acylate film 90 is transported to the winder 95. A press roller 107 adjusts pressure applied to the cellulose acylate film 90 in the course of the winding. A winding roller 108 winds the cellulose acylate film 90. The tension in winding the cellulose acylate film 90 should preferably change gradually from the start to the end of the winding. This is effective in safely winding without occurrence of wrinkles, streaks or other defects.

According to the above, the cellulose acylate film 90 with high flatness can be produced rapidly and stably. A web length of the cellulose acylate film 90 can be equal to or more than 100 meters in the casting direction. The cellulose acylate film 90 can have a width equal to or more than 1,400 mm and equal to or less than 1,800 mm. The feature of the invention is effective also if the width is over 1,800 mm. The thickness of the cellulose acylate film 90 as a final product is not limited, but can be equal to or more than 20 microns and equal to or less than 500 microns. The thickness of the cellulose acylate film 90 is preferably equal to or more than 30 microns and equal to or less than 300 microns, and desirably equal to or more than 35 microns and equal to or less than 200 microns. The thickness of the polymer film may be very small according to the invention, for example a thickness equal to or more than 15 microns and equal to or less than 100 microns.

In the above embodiment, a single dope is cast to form a polymer film of a single layer. In the solution casting of the invention, the dopes, namely two or more dopes, can be cast according to simultaneous multi casting or successive multi casting. For the simultaneous multi casting, it is possible to use any one of a casting die with a feed block, and a multi-manifold casting die. Various methods suggested in JP-A 2005-104148 are usable in combination with the casting of the invention, the methods including construction of the casting die, decompression chamber, support and other mechanical elements, multi casting, stripping, stretching, conditioning for drying in respective steps, polymer film handling, winding after eliminating a curl for flatness, solvent collection, and polymer film collection. Those can be used in the present invention.

A. Support of Metal for Solution Casting

Suggested in JP A 2000-84960; U.S. Pat. No. 2,336,310, U.S. Pat. No. 2,367,603, U.S. Pat. No. 2,492,078, U.S. Pat. No. 2,492,977, U.S. Pat. No. 2,492,978, U.S. Pat. No. 2,607,704, U.S. Pat. No. 2,739,069, U.S. Pat. No. 2,739,070, GB A 640731 (corresponding to U.S. Pat. No. 2,492,977), GB A 735892; JP B 45-4554, JP B 49-5614, JP A 60-176834, JP A 60-203430, and JP A 62-115035.

B. Multi Casting

Suggested in JP B 62-43846; JP A 61-158414, JP A 1-122419, JP B 60-27562, JP A 61-94724, JP A 61-947245, JP A 61-104813, JP A 61-158413, JP A 6-134933; JP A 56-162617; JP A 61-94724, JP A 61-94725, and JP A 11-198285.

C. Specific Methods of Casting of Cellulose Esters

Suggested in JP A 61-94724, JP A 61-148013, JP A 4-85011 (corresponding to U.S. Pat. No. 5,188,788), JP A 4-286611, JP A 5-185443, JP A 5-185445, JP A 6-278149, and JP A 8-207210.

D. Stretching

Suggested in JP A 62-115035, JP A 4-152125, JP A 4-284211, JP A 4-298310, and JP A 11-48271.

E. Specific Methods of Drying

Suggested in JP A 8-134336, JP A 8-259706, and JP A 8-325388.

F. Drying of Specific Controls of Heat

Suggested in JP A 04-001009 (corresponding to U.S. Pat. No. 5,152,947), JP A 62-046626, JP A 04-286611, and JP A 2000-002809.

G. Drying in Preventing Wrinkles

Suggested in JP A 11-123732, JP A 11-138568, and JP A 2000-176950.

Curls, thickness and their measurement of the wound polymer film are suggested in known documents mentioned in JP-A 2005-104148. These can be used in the present invention.

No. 1. Curls and Thickness of the Polymer Film

Suggested in JP-A 2003-011143, JP-A 2002-214432, JP-A 2002-221620, JP-A 2003-055477, and JP-A 2003-014556.

No. 2. Thickness and its Measurement

Suggested in JP-A 2003-098345, JP-A 2000-009931, JP-A 2001-343528 (corresponding to U.S.P. 2002/192397), JP-A 2002-122735, and JP-A 2002-194107.

At least one of the two surfaces of the polymer film is preferably processed by surface processing so as to ensure adhesion with a polarization plate or other optics. Examples of the surface processing include vacuum glow discharge processing, atmospheric pressure plasma discharge processing, ultraviolet radiation applying processing, corona discharge processing, flame processing, acid processing, alkali processing and the like.

The obtained cast film as a final product can preferably be coated with a functional material, to form a functional film including the polymer film as base, and one or two functional layers overlaid on the base. Examples of functional layers include an antistatic layer, a hard resin layer, anti reflection layer, attachment facilitating layer, anti-glare layer, optical compensation layer and the like. For example, forming of the anti reflection layer can result in obtaining anti reflection film of which high image quality is available by preventing reflection of outer light. Methods of adding the surface processed functional layers to the cellulose ester film, and their various conditions are according to techniques suggested in JP-A 2005-104148. Those can be used in the present invention.

I. Plasma Processing in General

Suggested in JP A 6-123062 (corresponding to EP A 592979), JP A 11-5857, and JP A 11-293011.

II. Specific Methods of Plasma Processing

Suggested in JP A 2003-161807, JP A 2003-166063 (corresponding to U.S. Pat. No. 6,849,306), JP A 2003-171770, JP A 2003-183836, JP A 2003-201568, and JP A 2003-201570.

III. Glow Discharge Processing

Suggested in U.S. Pat. No. 3,462,335, U.S. Pat. No. 3,761,299, U.S. Pat. No. 4,072,769, GB A 891469; JP A 59-056430, and JP B 60-16614 (corresponding to GB A 1579002).

IV. Ultraviolet Processing

Suggested in JP B 43-2603, JP B 43-2604, and JP B 45-3828 (corresponding to GB A 1149812).

V. Corona Discharge Processing

Suggested in JP B 39-12838, JP A 47-19824 (corresponding to U.S. Pat. No. 3,849,166), JP A 48-28067 (corresponding to U.S. Pat. No. 3,755,683), and JP A 52-42114 (corresponding to U.S. Pat. No. 4,135,932).

VI. Matte Agents for Undercoats

Suggested in U.S. Pat. No. 4,142,894, and U.S. Pat. No. 4,396,706.

VII. Lubricants

Suggested in JP B 53-292, U.S. Pat. No. 3,933,516, U.S. Pat. No. 4,275,146; JP B 58-33541, GB A 927446 (corresponding to U.S. Pat. No. 3,121,060); JP A 55-126238, JP A 58-90633; JP A 58-50534; and European Patent Application 90108115 (corresponding to U.S. Pat. No. 5,063,147).

VIII. Polyorganosiloxanes as Lubricants

Suggested in JP B 53-292, JP B 55-49294, and JP A 60-140341.

IX. Antistatic Agents of Ionic Macromolecular Types

Suggested in JP B 49-23827, JP B 49-23828, JP B 47-28937; JP B 55-734, JP A 50-54672, JP B 59-14735, JP B 57-18175, JP B 57-18176, JP B 57-56059; JP B 53-13223, JP B 57-15376, JP B 53-45231, JP B 55-145783, JP B 55-65950, JP B 55-67746, JP B 57-11342, JP B 57-19735, JP B 58-56858, JP A 61-27853, and JP B 62-9346.

X. Polymer Films Coatable with Hard Coat Layers

Suggested in JP A 6-123806, JP A 9-113728, and JP A 9-203810.

XI. Photo Polymerizable Compounds

Suggested in JP A 50-151996, JP A 50-158680; JP A 50-151997 (corresponding to U.S. Pat. No. 4,058,401), JP A 52-30899 (corresponding to U.S. Pat. No. 4,256,828), JP A 55-125105; JP A 56-8428 (corresponding to U.S. Pat. No. 4,299,938), JP A 56-55420 (corresponding to U.S. Pat. No. 4,374,066), JP A 56-149402 (corresponding to U.S. Pat. No. 4,339,567), JP A 57-192429 (corresponding to U.S. Pat. No. 4,387,216); JP B 49-17040; and U.S. Pat. No. 4,139,655.

XII. Coatings for Preventing Reflection

Suggested in JP A 7-126552, JP A 7-188582, JP A 8-48935, JP A 8-100136, JP A 9-220791, and JP A 9-272169.

Various examples of liquid crystal display panels are known and suggested in JP-A 2005-104148, including TN type, STN type, VA type, OCB type, reflection type and the like. Any of those can be used in the present invention.

No. 1. Cellulose Ester Protective Films for Polarizers

Suggested in JP A 10-095861, JP A 10-095862, and JP A 09-113727.

No. 2. Uses of Cellulose Ester Films as High Performance Optical Elements

Suggested in JP A 2000-284124, JP A 2000-284123, and JP A 11-254466.

No. 3. Production of Cellulose Ester Films as High Performance Optical Elements

Suggested in JP A 2000-131523, JP A 06-130226, JP A 06-235819, JP A 2000-212298 (corresponding to U.S. Pat. No. 6,731,357), and JP A 2000-204173.

No. 4. Optical Compensation Sheets

Suggested in JP A 3-9325 (corresponding to U.S. Pat. No. 5,132,147), JP A 6-148429, JP A 8-50206 (corresponding to U.S. Pat. No. 5,583,679), and JP A 9-26572 (corresponding to U.S. Pat. No. 5,855,971).

No. 5. TN Type of LCD Panels

Suggested in JP A 3-9325 (corresponding to U.S. Pat. No. 5,132,147), JP A 6-148429, JP A 8-50206 (corresponding to U.S. Pat. No. 5,583,679), and JP A 9-26572 (corresponding to U.S. Pat. No. 5,855,971).

No. 6. Reflection Type of LCD Panels

Suggested in JP A 10-123478, WO 9848320 (corresponding to U.S. Pat. No. 6,791,640), JP B 3022477 (corresponding to U.S. Pat. No. 6,433,845); and WO 00-65384 (corresponding to EP A 1182470).

No. 7. Discotic Compounds as Coating Cellulose Ester Films

Suggested in JP A 7-267902, JP A 7-281028 (corresponding to U.S. Pat. No. 5,518,783), and JP A 7-306317.

No. 8. Characteristics of Optical Compensation Sheets

Suggested in JP A 8-5837, JP A 7-191217, JP A 8-50206, and JP A 7-281028.

No. 9. Production of Optical Compensation Sheets

Suggested in JP A 9-73081, JP A 8-160431, and JP A 9-73016.

No. 10. Use of Cellulose Ester Films in LCD Panels

Suggested in JP A 8-95034, JP A 9-197397, and JP A 11-316378.

No. 11. LCD Elements of Guest-Host Reflection Types

Suggested in JP A 6-222350, JP A 8-36174, JP A 10-268300, JP A 10-292175, JP A 10-293301, JP A 10-311976, JP A 10-319442, JP A 10-325953, JP A 10-333138, and JP A 11-38410.

No. 12. Coating Methods

Suggested in U.S. Pat. No. 2,681,294; U.S. Pat. No. 2,761,791, U.S. Pat. No. 2,941,898, U.S. Pat. No. 3,508,947, and U.S. Pat. No. 3,526,528.

No. 13. Constructions of Overlaying Coatings

Suggested in JP A 8-122504, JP A 8-110401, JP A 10-300902 (corresponding to U.S. Pat. No. 6,207,263), JP A 2000-111706; JP A 10-206603 (corresponding to U.S. Pat. No. 6,207,263), and JP A 2002-243906.

No. 14. High Refractive Index Layer and Middle Refractive Index Layer

Suggested in JP A 11-295503, JP A 11-153703, JP A 2000-9908; JP A 2001-310432; JP A 2001-166104; JP A 11-153703, U.S. Pat. No. 6,210,858, JP A 2002-2776069; JP A 2000-47004, JP A 2001-315242, JP A 2001-31871, JP A 2001-296401; and JP A 2001-293818.

No. 15. Low Refractive Index Layer

Suggested in JP A 9-222503; JP A 11-38202; JP A 2001-40284; JP A 2000-284102; JP A 11-258403; JP A 58-142958, JP A 58-147483, JP A 58-147484, JP A 9-157582, JP A 11-106704; JP A 2000-117902, JP A 2001-48590, and JP A 2002-53804.

No. 16. Hard Coat Layer

Suggested in JP A 2002-144913, JP A 2000-9908, and WO 00/46617 (corresponding to U.S. Pat. No. 7,063,872).

No. 17. Front Scattering Layer

Suggested in JP A 11-38208, JP A 2000-199809, and JP A 2002-107512.

No. 18. Antiglare Characteristic

Suggested in Japanese Patent Application 2000-271878 (corresponding to JP A 2002-082207); JP A 2001-281410, Japanese Patent Application 2000-95893 (corresponding to U.S. Pat. No. 6,778,240), JP A 2001-100004 (corresponding to U.S. Pat. No. 6,693,746), JP A 2001-281407; JP A 63-278839, JP A 11-183710, and JP A 2000-275401.

No. 19. Dichroic Compounds

Suggested in JP A 1-161202, JP A 1-172906, JP A 1-172907, JP A 1-183602, JP A 1-248105, JP A 1-265205, and JP A 7-261024 (corresponding to U.S. Pat. No. 5,706,131).

No. 20. Various Devices and Films for Optics

Suggested in JP A 5-19115, JP A 5-119216, JP A 5-162261, JP A 5-182518, JP A 5-196819, JP A 5-264811, JP A 5-281411, JP A 5-281417, JP A 5-281537, JP A 5-288921, JP A 5-288923, JP A 5-311119, JP A 5-339395, JP A 5-40204, JP A 5-45512, JP A 6-109922, JP A 6-123805, JP A 6-160626, JP A 6-214107, JP A 6-214108, JP A 6-214109, JP A 6-222209, JP A 6-222353, JP A 6-234175, JP A 6-235810, JP A 6-241397, JP A 6-258520, JP A 6-264030, JP A 6-305270, JP A 6-331826, JP A 6-347641, JP A 6-75110, JP A 6-75111, JP A 6-82779, JP A 6-93133, JP A 7-104126, JP A 7-134212, JP A 7-181322, JP A 7-188383, JP A 7-230086, JP A 7-290652, JP A 7-294903, JP A 7-294904, JP A 7-294905, JP A 7-325219, JP A 7-56014, JP A 7-56017, JP A 7-92321, JP A 8-122525, JP A 8-146220, JP A 8-171016, JP A 8-188661, JP A 8-21999, JP A 8-240712, JP A 8-25575, JP A 8-286179, JP A 8-292322, JP A 8-297211, JP A 8-304624, JP A 8-313881, JP A 8-43812, JP A 8-62419, JP A 8-62422, JP A 8-76112, JP A 8-94834, JP A 9-137143, JP A 9-197127, JP A 9-251110, JP A 9-258023, JP A 9-269413, JP A 9-269414, JP A 9-281483, JP A 9-288212, JP A 9-288213, JP A 9-292525, JP A 9-292526, JP A 9-294959, JP A 9-318817, JP A 9-80233, JP A 9-99515, JP A 10-10320, JP A 10-104428, JP A 10-111403, JP A 10-111507, JP A 10-123302, JP A 10-123322, JP A 10-123323, JP A 10-176118, JP A 10-186133, JP A 10-264322, JP A 10-268133, JP A 10-268134, JP A 10-319408, JP A 10-332933, JP A 10-39137, JP A 10-39140, JP A 10-68821, JP A 10-68824, JP A 10-90517, JP A 11-116903, JP A 11-181131, JP A 11-211901, JP A 11-211914, JP A 11-242119, JP A 11-246693, JP A 11-246694, JP A 11-256117, JP A 11-258425, JP A 11-263861, JP A 11-287902, JP A 11-295525, JP A 11-295527, JP A 11-302423, JP A 11-309830, JP A 11-323552, JP A 11-335641, JP A 11-344700, JP A 11-349947, JP A 11-95011, JP A 11-95030, JP A 11-95208, JP A 2000-109780, JP A 2000-110070, JP A 2000-119657, JP A 2000-141556, JP A 2000-147208, JP A 2000-17099, JP A 2000-171603, JP A 2000-171618, JP A 2000-180615, JP A 2000-187102, JP A 2000-187106, JP A 2000-191819, JP A 2000-191821, JP A 2000-193804, JP A 2000-204189, JP A 2000-206306, JP A 2000-214323, JP A 2000-214329, JP A 2000-230159, JP A 2000-235107, JP A 2000-241626, JP A 2000-250038, JP A 2000-267095, JP A 2000-284122, JP A 2000-292780, JP A 2000-292781, JP A 2000-304927, JP A 2000-304928, JP A 2000-304929, JP A 2000-309195, JP A 2000-309196, JP A 2000-309198, JP A 2000-309642, JP A 2000-310704, JP A 2000-310708, JP A 2000-310709, JP A 2000-310710, JP A 2000-310711, JP A 2000-310712, JP A 2000-310713, JP A 2000-310714, JP A 2000-310715, JP A 2000-310716, JP A 2000-310717, JP A 2000-321560, JP A 2000-321567, JP A 2000-329936, JP A 2000-329941, JP A 2000-338309, JP A 2000-338329, JP A 2000-344905, JP A 2000-347016, JP A 2000-347017, JP A 2000-347026, JP A 2000-347027, JP A 2000-347029, JP A 2000-347030, JP A 2000-347031, JP A 2000-347032, JP A 2000-347033, JP A 2000-347034, JP A 2000-347035, JP A 2000-347037, JP A 2000-347038, JP A 2000-86989, and JP A 2000-98392; and JP A 2001-4819, JP A 2001-4829, JP A 2001-4830, JP A 2001-4831, JP A 2001-4832, JP A 2001-4834, JP A 2001-4835, JP A 2001-4836, JP A 2001-4838, JP A 2001-4839, JP A 2001-100012, JP A 2001-108805, JP A 2001-108806, JP A 2001-133627, JP A 2001-133628, JP A 2001-142062, JP A 2001-142072, JP A 2001-174630, JP A 2001-174634, JP A 2001-174637, JP A 2001-179902, JP A 2001-183526, JP A 2001-183653, JP A 2001-188103, JP A 2001-188124, JP A 2001-188125, JP A 2001-188225, JP A 2001-188231, JP A 2001-194505, JP A 2001-228311, JP A 2001-228333, JP A 2001-242461, JP A 2001-242546, JP A 2001-247834, JP A 2001-26061, JP A 2001-264517, JP A 2001-272535, JP A 2001-278924, JP A 2001-2797, JP A 2001-287308, JP A 2001-305345, JP A 2001-311823, JP A 2001-311827, JP A 2001-350005, JP A 2001-356207, JP A 2001-356213, JP A 2001-42122, JP A 2001-42323, JP A 2001-42325, JP A 2001-51118, JP A 2001-51119, JP A 2001-51120, JP A 2001-51273, JP A 2001-51274, JP A 2001-55573, JP A 2001-66431, JP A 2001-66597, JP A 2001-74920, JP A 2001-81469, JP A 2001-83329, JP A 2001-83515, JP A 2001-91719, JP A 2002-162628, JP A 2002-169024, JP A 2002-189421, JP A 2002-201367, JP A 2002-20410, JP A 2002-258046, JP A 2002-275391, JP A 2002-294174, JP A 2002-311214, JP A 2002-311246, JP A 2002-328233, JP A 2002-338703, JP A 2002-363266, JP A 2002-365164, JP A 2002-370303, JP A 2002-40209, JP A 2002-48917, JP A 2002-6109, JP A 2002-71950, JP A 2002-82222, JP A 2002-90528, JP A 2003-105540, JP A 2003-114331, JP A 2003-131036, JP A 2003-139952, JP A 2003-153353, JP A 2003-172819, JP A 2003-35819, JP A 2003-43252, JP A 2003-50318, and JP A 2003-96066.

Examples and comparisons, which were produced in connection with the present invention, are hereinafter described for explanation of the invention. Note that the invention is not limited to the examples.

Raw materials for the dope 27 prepared by the dope producing apparatus 10 of FIG. 1 in the example were as follows.

[Materials for Dope]

| | |
|---|---|
| Cellulose triacetate | 100 parts by weight |
| Dichloromethane | 320 parts by weight |
| Methanol | 83 parts by weight |
| 1-butanol | 3 parts by weight |
| Plasticizer A | 7.6 parts by weight |
| Plasticizer B | 3.8 parts by weight |
| UV absorber a | 0.7 part by weight |
| UV absorber b | 0.3 part by weight |
| Fine particles | 0.05 part by weight |

In the list, the cellulose triacetate was powder particles having the following specifics—substitution degree: 2.84, viscosity average degree of polymerization (DP): 306, water content: 0.2 wt. %, viscosity of 6 wt. % dichloromethane solution: 315 mPa·s, average particle diameter of powder particles: 1.5 mm, standard deviation of the particle diameter of powder particles: 0.5 mm. The plasticizer A was triphenylphosphate. The plasticizer B was diphenylphosphate. The UV absorber a was 2(2'-hydroxy-3',5'-di-tert-butylphenyl)benzotriazol. The UV absorber b was 2(2'-hydroxy-3',5'-di-tert-amylphenyl)5-chlorobenzotriazol. The citrate ester compound was mixture of citrate esters (mixture of citric acid, citrate monoethyl ester, citrate diethyl ester, and citrate triethyl ester). The fine particles were particles of silicon dioxide with an average particle diameter of 15 nm, and Mohs hardness number of approx. 7. In the preparation of the dope, retardation control agent N-N-di-m-toluyl-N—P-methoxy phenyl-1,3,5-triazine-2,4,6-triamine was added at an amount of 4.0 wt. % relative to the total weight of the polymer film.

[Dope Production]

The valves V1 and V2 were opened. The solvent reservoir 11 supplied the solvent of a suitable amount to the mixing tank 15, to which the additive reservoir 12 supplied additive solution of a suitable amount. The hopper 13 supplied the mixing tank 15 with cellulose acylate of a suitable amount. The motors 18 and 19 caused the first stirrer or anchor stirrer 20 and the second stirrer or dissolver stirrer 22 to rotate in the mixing tank 15 to prepare the mixed solution 25 by mixing the various materials for the dope. In the mixing tank 15, the inner temperature was conditioned at a constant level in a range of −10 to 55 deg. C. by circulation after sending the heat exchange medium into the jacket 17 in a state conditioned for the temperature.

The mixed solution 25 was delivered from the mixing tank 15 by the pump P1 and sent to the heater 26, where the dissolving amount of the solid content in the solvent was increased. Then the jacket 17 was conditioned at the room temperature by the temperature adjuster 29, to obtain the dope 27. The dope 27 was sent to the first filtration device 30 having porous filter paper with an average pore diameter equal to or smaller than 100 microns, to eliminate foreign particles of a large size in the dope 27. Then the dope 27 was sent to the flash evaporator or flash device 40 by opening and closing of the valve V3, for condensation by evaporation of the solvent. The dope 27 was delivered from the flash device 40 by the pump P2, filtrated by the second filtration device 44, and stirred and stored in the storage reservoir or stock tank 33 before a flow for casting.

The dope 27 of a suitable amount is sent from the storage reservoir or stock tank 33 to the conduit 45. Then the precipitation inhibitor 47a containing magnesium sulfate was sent from the precipitation inhibitor reservoir 47 to the conduit 45. The dope 27 and the precipitation inhibitor 47a were mixed by stirring of the static mixer 48. The precipitation inhibitor 47a was added at such an adjusted amount that a ratio M2/M1 was equal to $200 \times 10^{-6}$, where M1 (grams) was a weight of the cellulose acylate contained in the dope 27, and M2 (grams) was a weight of the magnesium in the precipitation inhibitor 47a.

[Film Production]

The film producing apparatus 50 of FIG. 3 was used to produce the cellulose acylate film 90 from the dope 27. The dope producing apparatus 10 supplied the casting die 76 with dope of a suitable amount through the feed block 73. The slot of the casting die 76 ejected the dope 27 on to the support drum 77 rotating continuously, to form the cast film 75. In the casting, the side of the bead on the side of the support drum 77 was decompressed by the decompression chamber 79. A flow rate of the dope 27 was so conditioned as to form the cellulose acylate film 90 being 80 microns thick after drying.

The support drum 77 was a drum of stainless steel, and controllable by a driving device (not shown) for rotational speed. Heat exchange medium or coolant was supplied by a heat exchange medium circulator (not shown) to the support drum 77, which was conditioned at the surface temperature of −10 deg. C. The support drum 77 rotated at a speed of 100 r/min. in the course of casting. The casting die 76 had a slot with a width of 1.8 meters. A jacket (not shown) was provided in combination with the casting die 76, for setting the dope 27 at 36 deg. C. Conduits for dope 27 and the feed block 31 were conditioned by heat adjusters equally at the inner temperature of 36 deg. C.

The cast film 75 gelled to have the self-supporting property was supported by the stripping roller 85 and stripped from the support drum 77. The cast film 75 was transported to the transition region 86, where the dryer 87 blew dry air conditioned at 40 deg. C. to the cast film 75 to dry the cast film 75 in transport by plural pass rollers. Then the cast film 75 was sent to the tentering machine 88 of a pin type. A plurality of pins were pierced in web edge portions of the cast film 75. Dry air was blown by a dryer (not shown) to the cast film 75 while the cast film 75 was stretched in the web width direction. The cast film 75 was dried to obtain the cellulose acylate film 90.

Web edges of the cellulose acylate film 90 were slitted by the web edge slitter 92 within 30 seconds after moving from a downstream end of the tentering machine 88. An NT cutter in the web edge slitter 92 slitted the web edges on lines extending at a distance of 50 mm from the edge lines. A cutter blower (not shown) moved the obtained web edge portions by blowing into the film crusher 94, which ground the web edge portions into chips or particles with an average area of 80 sq. mm.

Between the web edge slitter 92 and the drying chamber 97, there was a pre-drying chamber (not shown), which heated the cellulose acylate film 90 in a preliminary manner with dry gas of 100 deg. C. before drying in the drying chamber 97. A temperature adjuster (not shown) conditioned the inner temperature of the drying chamber 97 to keep the surface temperature of the cellulose acylate film 90 at 140 deg. C. The cellulose acylate film 90 was transported through the drying chamber 97 by the rollers 96, and dried by the drying chamber 97. Time of drying the cellulose acylate film 90 with the drying chamber 97 was 10 minutes. The surface temperature of the cellulose acylate film 90 was measured by a thermometer (not shown) disposed close to the surface of the cellulose acylate film 90 and directly higher than the path of the cellulose acylate film 90. The solvent gas contained in the dry gas was collectively removed by adsorption of the adsorption solvent recovery device 99. An agent for adsorption was activated carbon. Desorption after the absorption was made by use of dry nitrogen. The collected solvent was conditioned with water at a small level equal to or less than 0.3 wt. % of water content, so the water content of the solvent gas was eliminated.

A fluidity adjusting chamber (not shown) was installed between the drying chamber 97 and the cooling chamber 100. At first, air at the temperature of 50 deg. C. and having the condensation point of 20 deg. C. was blown by the fluidity adjusting chamber to the cellulose acylate film 90. Then air at the temperature of 90 deg. C. and having humidity of 70% RH was blown by the fluidity adjusting chamber to the cellulose acylate film 90, so that curl in the cellulose acylate film 90 was eliminated. Then the cellulose acylate film 90 was transported into the cooling chamber 100, and was gradually cooled to a level equal to or lower than 30 deg. C. The voltage of electrification of the cellulose acylate film 90 was conditioned by the static eliminator 103 in a range equal to or higher than −3 kV and equal to or lower than +3 kV. While the cellulose acylate film 90 was transported, the knurling roller 104 knurled each of the web edge portions of the cellulose acylate film 90, and straightened unevenness of its surface. The knurling was edge embossing at a width of 10 mm. A pressure for the knurling was conditioned so as to obtain an average maximum height of the knurled pattern being 12 microns higher than an average thickness of the cellulose acylate film 90.

The cellulose acylate film 90 was transported into the winder 95, where the press roller 107 pressed the cellulose acylate film 90 at the pressure of 50 N/m, and the cellulose acylate film 90 was wound by the winding roller 108 having a diameter of 169 mm. The tension to the cellulose acylate film 90 was 300 N/m at the start of winding, and was 200 N/m at the end of winding. Thus, a roll of the cellulose acylate film 90 was obtained. The cellulose acylate film 90 was 80 microns thick. In the entirety of the film production, an average drying speed of the cast film 75 or the cellulose acylate film 90 was 20 wt. % per minute.

Effects of the invention were evaluated. The surface of the support drum 77 after stripping of the cast film 75 and before next casting of the dope 27 was observed by human eyes. Degree of plating out was evaluated according to an observed amount of fine dust. Four grades of A, B, C and F were determined and used. A was a situation free from plating out. B was a situation with a small amount of fine dust but in a very safe range in view of production. C was a situation with a relatively great amount of fine dust but in a still safe range in view of production. F was a situation with a very great amount of fine dust in an improper range in view of production. As a result, Example 1 was found graded as A, because no plating out was observed at all. Note that the following examples and comparisons were evaluated by the same evaluation.

Example 2

Example 1 was repeated with a difference in that the ratio M2/M1 was set equal to $100\times10^{-6}$ by conditioning an amount of the precipitation inhibitor 47a. As a result, a small amount of plating out was observed on the support drum 77, and was graded as B without a problem.

Example 3

Example 1 was repeated with a difference in that the ratio M2/M1 was set equal to $50\times10^{-6}$ by conditioning an amount of the precipitation inhibitor 47a. As a result, a great amount of plating out was observed on the support drum 77, but was graded as C without a serious problem.

[Comparison 1]

Example 1 was repeated with a difference in that the dope 27 did not contain the precipitation inhibitor 47a. As a result, a seriously great amount of plating out was observed on the support drum 77 in a manner graded as F.

In conclusion, it was found that occurrence of plating out was suppressed on the support even in the continuous film forming when the dope contained a magnesium salt added thereto. Addition of the magnesium sulfate as magnesium salt is highly effective in suppressing creation of calcium salts of fatty acids. Insoluble precipitate can be trapped efficiently and effectively by filtration of the dope after addition of the magnesium salt, to obtain the dope containing a very small amount of the insoluble precipitate. It is possible to produce the polymer film with high flatness continuously by suppressing occurrence of the plating out.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A cellulose acylate film producing method of producing cellulose acylate film by casting dope containing cellulose acylate and solvent, comprising a step of:
   using said dope containing a magnesium salt to satisfy a condition of a value of M2/M1 being equal to or more than $1\times10^{-6}$ and equal to or less than $1\times10^{-3}$, where M1 is a weight of said cellulose acylate, and M2 is a weight of magnesium in said magnesium salt,
   wherein said magnesium salt is selected from magnesium sulfate, magnesium chloride, magnesium bromide, magnesium iodide, magnesium nitrate, and magnesium phosphate.

2. A cellulose acylate film producing method as defined in claim 1, wherein if said dope contains a calcium ion, said magnesium salt suppresses creation of insoluble precipitate of a calcium salt of a fatty acid from a fatty acid ion in said dope.

3. A cellulose acylate film producing method as defined in claim 2, wherein said magnesium salt is magnesium sulfate.

4. A cellulose acylate film producing method as defined in claim 3, further comprising a step of filtrating said dope with a filtration device after addition of said magnesium salt, to trap insoluble precipitate containing calcium sulfate created by binding of a sulfate ion derived from said magnesium sulfate and said calcium ion.

5. A cellulose acylate film producing method as defined in claim 1, wherein a value of M3/M2 is equal to or more than $1\times10^{-3}$ and equal to or less than 10, where M3 is a weight of calcium contained in said dope.

* * * * *